United States Patent [19]
Kashio

[11] 3,999,164
[45] Dec. 21, 1976

[54] PRINTING DEVICE

[75] Inventor: Toshio Kashio, Tokyo, Japan

[73] Assignee: Casio Computer Co., Ltd., Tokyo, Japan

[22] Filed: May 12, 1975

[21] Appl. No.: 576,652

[30] Foreign Application Priority Data

May 13, 1974 Japan .............................. 49-52265

[52] U.S. Cl. .............................. 340/172.5; 197/176
[51] Int. Cl.[2] ...................... G06F 3/12; G06C 23/06
[58] Field of Search .................... 445/1; 340/172.5; 197/20, 19, 176, 177

[56] References Cited

UNITED STATES PATENTS

| | | | |
|---|---|---|---|
| 3,286,237 | 11/1966 | Kikuchi | 340/172.5 |
| 3,403,386 | 9/1968 | Perkins et al. | 340/172.5 |
| 3,408,633 | 10/1968 | Shimabukuro | 340/172.5 |
| 3,519,118 | 7/1970 | Reszka | 197/176 |
| 3,585,600 | 6/1971 | Salini | 340/172.5 |
| 3,596,252 | 7/1971 | Duncan | 340/172.5 |
| 3,749,223 | 7/1973 | Guzak | 197/176 |
| 3,760,376 | 9/1973 | Tanner | 340/172.5 |
| 3,805,249 | 4/1974 | Rich | 340/172.5 |
| 3,805,940 | 4/1974 | Stockham | 197/20 |
| 3,815,104 | 6/1974 | Goldman | 340/172.5 |
| 3,828,316 | 8/1974 | Card et al. | 340/172.5 |
| 3,832,697 | 8/1974 | Kashio | 340/172.5 |
| 3,927,395 | 12/1975 | Kashio | 340/172.5 |

*Primary Examiner*—Mark E. Nusbaum
*Assistant Examiner*—Jan Rhoads
*Attorney, Agent, or Firm*—Flynn & Frishauf

[57] ABSTRACT

A printing device for printing on a recording paper a plurality of unit record data, each unit record data comprising a plurality of data words, in such a tabulation that the word data of each of the unit record datum are printed in respective columns so as to form a line and so as to be vertically aligned with the work data of another unit record data to be printed in the same column. The printing device comprises a data memory means for storing coded information comprised of a plurality of serially arranged unit record data, counter means for counting the number of digits of each of the word datum as the unit record data are read out from the data memory means one after another, and column width memory means for storing the number of digits of each of the word datum of any of the unit record datum which have been counted by the counter means and which define the width of the column on the recording paper. Further provided is a comparator means for comparing the number of digits in each of the word datum in any record datum which is stored in the column width memory means with that of the word datum in the next unit record datum to be printed in the same column. A column width rewriting means is provided for writing into the column width memory means, in place of the number of digits of each word datum in any unit record datum, the number of digits of the word datum in the next unit record data to be printed in the same column if the latter is found by the comparator means to be larger than the former. Printing means is further provided for printing the data in said data memory means and in accordance with the information stored in the column width memory means for printing the unit data records in columns on the recording paper.

9 Claims, 3 Drawing Figures

PRINTING DEVICE

BACKGROUND OF THE INVENTION

This invention relates to a printing device for controlling printing, by setting each column width based on the respective word data to be printed, the word data in the corresponding column on a recording paper to form a tabulation.

When a variety of data is totalized using an electronic computer etc., a number of data corresponding to the content of data to be totalized are stored in a memory device. If, for example, the results of transactions at the associated business offices are totalized monthly, a group of data based on each month can be obtained. The group of data is, after stored in the memory device, read out of the memory device and printed in each column on a recording paper as, for example, shown in FIG. 1. For example, the group of data monthly obtained from the associated business offices constitutes a unit record data corresponding to one line, and the groups of data so monthly obtained are sequentially stored in a series configuration in the memory device. The unit record data is so stored in the memory device that a key word representative of a month is followed, in a predetermined order, by word data respectively consisting of numerical values and corresponding to the results of transactions at the associated business offices such as TOKYO, OSAKA, NAGOYA . . . . business offices with the respective two adjacent word data divided by a word positioning code "BK" and the respective two adjacent unit record data divided by a unit record positioning code "BE".

The data stored in the memory device are suitably printed in each column on a recording paper. It is, however, necessary to effect printing after a tabulation as shown in FIG. 1 has been prepared beforehand according to the width of each word data read out of the memory device. In the preparation of the tabulation, therefore, the column width must be preliminarily selected according to the width of numerical data from the respective business offices and a tab-set be made according to the selected column width. Where the number of columns per line (i.e. the number of word data constituting one unit record data), as well as the number of characters in each word data, is predetermined, the width of a recording paper can be determined dependent upon the number of columns and the tab-set is effected accordingly. Where, however, the number of characters in each word data and the number of columns per line are not predetermined, it is impossible to preliminarily set the column width of the recording paper.

Suppose that the column width is predetermined irrespective of the length of word data to be printed. If, in this case, the number of characters in a certain word data exceeds the printable column width, printing can not be effected. The same result occurs if all the record data included in one unit record data are not accommodated within a capacity provided by all the preset column widths per line.

This invention is directed to the solution of the abovementioned drawbacks and, accordingly, the object of this invention is to provide a printing device which, after each column width is automatically set according to the number of digits in respective word data to be printed, can print the word data in the corresponding column on the recording paper to form a tabulation.

SUMMARY OF THE INVENTION

According to this invention there is provided a printing device comprising a memory device for sequentially storing in a series configuration respective unit record data, each comprising a plurality of word data to be printed on a recording paper; a counter for counting the number of digits in the respective word data sequentially read out of the memory device; a register for storing the number of digits in the word data counted at the counter; a comparing means for comparing the number of digits in the word data read out of the register with the number of digits in the word data counted at the counter, and for feeding the comparison result to the register so that that the register can be occupied by the so compared maximum column width data; print control means for controllably delivering, in accordance with the column width data so set, the word data read out of the memory device; and a printing means for sequentially printing the word data read out of the memory device, in the corresponding column on the recording paper upon receipt of a printing instruction from the print control means.

According to this invention the respective word data read out of a memory device can be sequentially printed in the corresponding column on the recording paper in the form of a tabulation by setting as a column width data the maximum number of digits selected columnwise from the word data read out of the memory device. Even if the number of characters constituting the word data exceeds the printable column width of the recording paper, or all of the word data constituting one unit record column are not accommodated within a capacity provided by all the preset column widths per line, no problem is presented in sequentially printing the respective word data read out of memory device, in the corresponding column on the recording paper.

BRIEF DESCRIPTION OF THE DRAWINGS

This invention can be more fully understood from the following detailed description when taken in conjunction with the accompanying drawings, in which.

DETAILED DESCRIPTION

Figure 3:
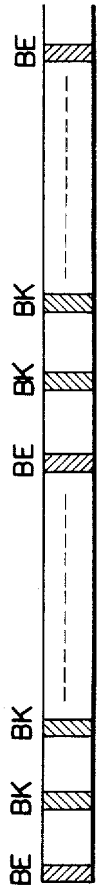
FIG. 3 shows the state of the word data stored in a memory device.
Figure 2:
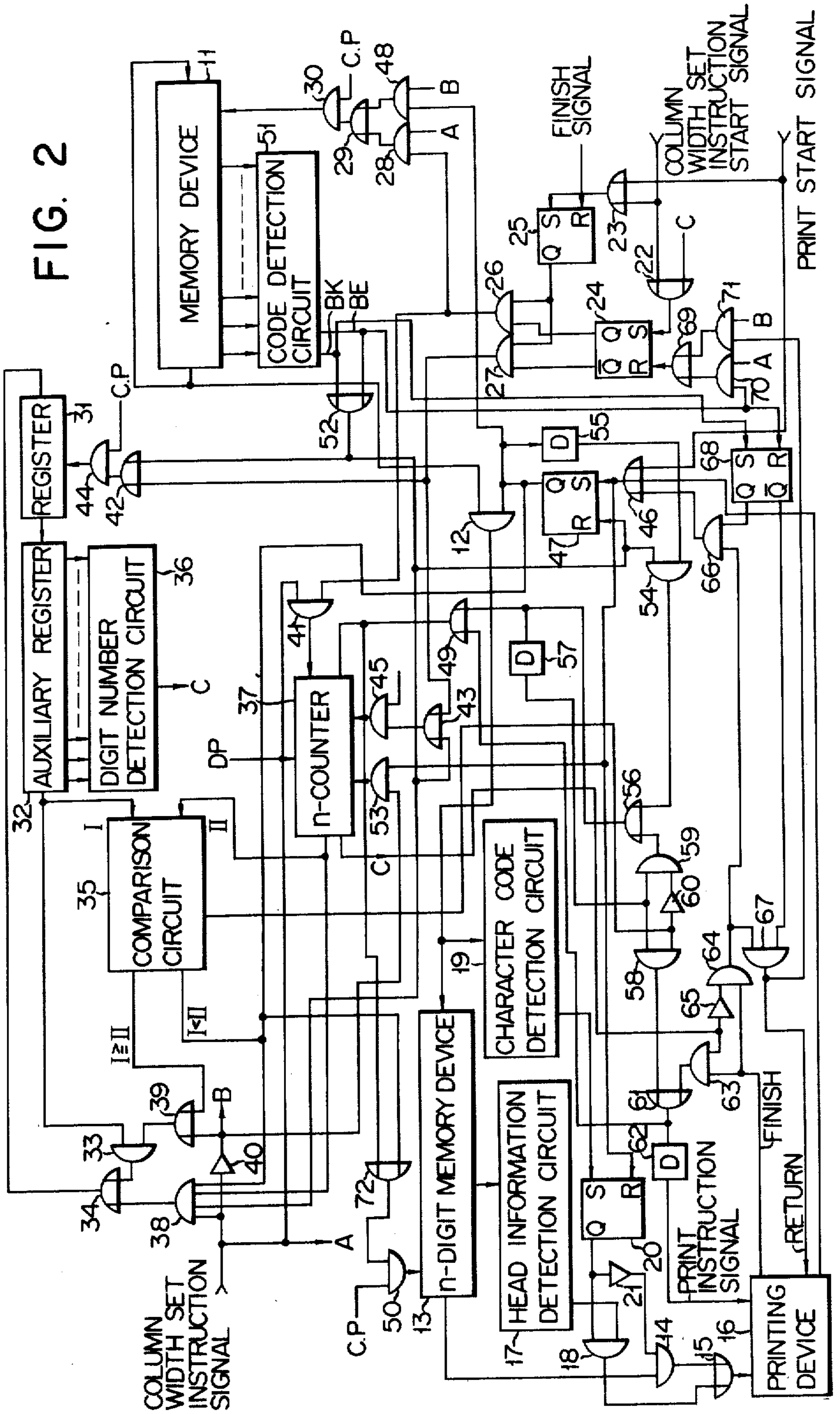
FIG. 2 is a block diagram showing a circuit arrangement of a printing device according to one embodiment of this invention.

In FIG. 2 a memory device 11 is adapted to store word data to be tabulated as above-mentioned and it consists of, for example, a shift register for serially storing a plurality of unit record data divided by a record data positioning code "BE," the unit record data each consisting of a plurality of word data divided by a word data positioning code "BK" as shown in FIG. 3. The output data of the memory device 11 is fed back to the input of the memory device 11 and through an AND circuit 12 to an $n$-digit memory device 13 which serves as a buffer register. Output data read out from the memory device 13 is delivered through an AND circuit 14 and OR circuit 15 to a printing device 16. To the memory device 13 is coupled a head word data detector 17 adapted to detect, and read out, the head word data stored in the memory device 13. The detected data of the head word detector 17 is coupled through an AND circuit 18 to the OR circuit 15. In this case, the AND circuits 14 and 18 are gate controlled in a reciprocal manner, and data from the AND circuit 12 is controlled at a character code detection circuit 19 dependent upon whether it is a numerical data or a character data. That is, a flip-flop circuit 20 is set by the output of the character code detector 19 to produce an output, causing the gate of the AND circuit 18 to be opened. When the flip-flop circuit 20 is set, the gate of the AND circuit 14 is controlled through an inverter 21 coupled to the output of the flip-flop circuit 20. A column width set instruction is applied to OR circuits 23 and 22, and a print start instruction is applied to the OR circuit 23 and OR circuit 46. Flip-flop circuits 24 and 25 are set by the output signals of the OR circuits 22 and 23, respectively. The flip-flop circuit 24, when set, produces an output signal which is coupled to an AND circuit 26. The flip-flop circuit 24, when reset, generates an output signal which is coupled to AND circuit 27. The flip-flop circuit 25, when set, generates an output signal which is coupled as a gate signal to the AND circuits 26 and 27. The output signal of the AND circuit 26 is delivered through an AND circuit 28 to an OR circuit 29. The other gate of an AND gate 30 is opened upon receipt of a clock pulse "CP" and the output of the AND gate 30 is sent to the memory device 11 to cause the latter to be shift-driven.

A column width memory device is provided, consisting of a shift register 31 and an auxiliary register 32. The column width memory device has a circulatory shift circuit including an AND circuit 33 and OR circuit 34 and the output data of the auxiliary register 32 is coupled as a comparison input I to a comparison circuit 35. The auxiliary register 32 further includes a digit number detecting circuit 36. When a memory data is present in the auxiliary register 32, the digit number detecting circuit 36 generates an output signal as indicated by an arrow C, which is coupled to the OR circuit 22. The count value signal of a scale-of-n counter 37 is supplied as a comparison input II to the comparison circuit 35. The scale-of-n counter 37 is count-controlled, by a digit pulse "DP," based on a count up instruction and count down instruction. The count value signal of the scale-of-n counter 37 is coupled through an AND circuit 38 to the OR circuit 34. To the AND circuit 38 are also coupled, as input signals, a column width set instruction signal, a code signal read out of the memory device 11 through a code detection circuit 51, and an output signal [I<II] generated when comparison is made at the comparison circuit 35. When on the other hand, an output signal [I II] is obtained from the comparison circuit 35, it is coupled as a gate signal to the AND circuit 33 through an OR circuit 39. The column width set instruction signal is coupled as a gate input to the OR circuit 39 through an inverter 40.

The column width set instruction signal as indicated by an arrow A is coupled as a gate signal to the AND circuit 28 and, together with output of the AND circuit 26, to an AND circuit 41. The output of the AND circuit 41 is supplied as a count up instruction to the scale-of-n counter 37. The output of the AND circuit 27 is coupled to OR circuits 42 and 43 and the gate of an AND circuit 44 to which is coupled a clock pulse "CP" is controlled by the output of the OR circuit 42. The registers 31 and 32 are shift-controlled by the output pulse of the AND circuit 44. The output of the OR circuit 43 is supplied as a preset signal, through an AND circuit 45 operating to be opened upon receipt of the column width set instruction signal, to the scale-of-n counter 37 to cause the latter to be preset to a count value 1. The print starting instruction signal is coupled to the OR circuits 23 and 46. The output of the OR circuit 46 is connected to the reset terminal of the flip-flop circuit 20 and to the set terminal of the flip-flop circuit 47. The output of the OR circuit 46 is also coupled, together with the output of the inverter 40, to the AND circuit 53. The output of the AND circuit 53 is supplied to the scale-of-n counter 37 to cause the latter to be preset to a count value *n*. The flip-flop circuit 47, when set, produces an output signal which is coupled to the AND circuits 12 and 48. The output of the inverter 40 as indicated by an arrow B is also coupled to the AND circuit 48 and the output of the AND circuit 48 is coupled to the OR circuit 29.

The memory device 11 has the code detection circuit 51 at its output digit side which generates detection signals upon receipt of the code "BK" and "BE" signals. The detection code "BK" and "BE" signals of the code detection circuit 51 are delivered to an OR circuit 52 to generate an output signal which is coupled to the Or circuits 42 and 43, as a gate signal to the AND circuits 38 and 54, and to the reset terminal of the flip-flop circuit 47. The flip-flop circuit 47, when set, generates an output signal which is coupled through a delay circuit 55 to the AND circuit 54. The output of the AND circuit 54 is coupled through an OR circuit 56 to an OR circuit 49. The output signal of the OR circuit 49 is supplied to the scale-of-n counter 37 as a count down instruction and to an AND circuit 50 through an OR circuit 72 to which is coupled the set output of the flip-flop circuit 47. The AND circuit 50 delivers, upon receipt of the clock pulse "CP,"an output signal as a shift instruction to the *n*-digit memory device 13. The output of the OR circuit 56 is coupled through a delay circuit 57 to AND circuits 58 and 59. The coincidence detection signal of the comparison circuit 35 is coupled to the AND circuit 58. An inverter 60 is coupled to the coincidence detection output terminal of the comparison circuit 35. The output of the inverter 60 is connected as a gate signal to the AND circuit 59. In the absence of any coincidence detection output signal from the comparison circuit 35 the output of the OR circuit is held.

The output signal of the AND circuit 58 is coupled to the input of the OR circuit 49 through an OR circuit 61, and as a print instruction to the printing device 16 through a delay circuit 62. The printing device 16 generates a print end signal each time one character is printed according to the print instruction. The print end signal is coupled to AND circuits 63 and 64. Where the scale-of-n counter 37 is occupied by the digit number, a gate signal is coupled to the AND circuit 63. The output of the AND circuit 63 is coupled to the OR circuit 61, and an output on the digit number detection terminal of the scale-of-n counter 37 is connected as a gate signal to the AND circuit 64 through an inverter 65. The output of the AND circuit 64 is coupled to AND circuits 66 and 67. The output of the AND circuit 66 is coupled to the OR circuit 46 and the output of the AND circuit 67 is connected as a return instruction to the printing device 16. The set output of a flip-flop circuit 68 is coupled to the other gate of the AND circuit 66 and the reset output of the flip-flop circuit 68 is coupled to the other gate of the AND circuit 67. The flip-flop circuit 68 is set by the code "BK" detection signal of the code detection circuit 51 and reset by the code "BE" detection signal. Upon completion of the return operation of the printing device 16 by the return instruction a return end signal is derived from the printing device 16. The return end signal of the printing device 16 is coupled to the OR circuit 46. The flip-flop circuit 24 is reset by the output of an OR circuit 69 to which are coupled to the outputs of AND circuits 70 and 71. To the input of the AND circuit 70 are coupled the column width set instruction signal A and the code "BE" detection signal of the code detection circuit 51. To the input of the AND circuit 71 are coupled the output signal B of the inverter 40 and the output signal of the AND circuit 67. With the above-mentioned printing device, a plurality of unit record data each consisting of a plurality of words divided by the word data positioning code "BK" are stored in a series configuration in the memory device 11, and the word data of the respective unit record data is printed in the corresponding column on a recording paper to form a tabulation. Where printing is to be effected, a column setting is effected on a recording paper, according to the content of the memory device 11, by the column width set signal and column width set instruction starting signal. Upon receipt of the column width set instruction signal and column width set instruction starting signal, flip-flop circuits 24 and 25 are set through the OR circuits 22 and 23, respectively, and the set outputs of these flip-flop circuits 24 and 25 are coupled to the AND circuit 26 to produce an output signal. Since, in this case, the column width set instruction signal A is present, an output signal appears at the AND circuit 28. The output of the AND circuit 28 is supplied through the OR circuit 29 to the AND circuit 30. The AND circuit 30, when receiving a clock pulse, generates an output which causes the memory device 11 to be shift driven. The scale-of-n counter 37 is set to a "count up" ready state by the output of the AND circuit 41 to which are coupled the output signal of the AND circuit 26 and the column width set instruction signal. That is, the content of the memory device 11 is shift-circuited from the output toward the input of the memory device 11 and the scale-of-n counter 37 is stepped by the digit pulse corresponding to the clock pulse and counts the number of digits of the numerical data so shift-circulated in the memory device 11. The count output signal of the scale-of-n counter 37 is supplied to the comparison circuit 35 and AND circuit 38. In this case, no numerical data is present in the registers 31 and 32, since the column width set instruction start signal has just now been applied. That is, the registers 31 and 32 are in the "zero" state and, therefore, an output signal [I<II] is generated from the comparison circuit 35. When the head word data of the head unit record data is read out of memory device 11, the code detection circuit 51 detects the word data positioning code "BK". That is, a shift instruction is given to the registers 31 and 32 through the OR circuits 52 and 42 and AND circuit 44, and also to the AND circuit 38. At this time, the count value of the scale-of-*n* counter 37 is written into the register 31. The data written into the register 31 corresponds to the digit configuration of the head word data of the heat unit record data stored in the memory device 11, i.e., the number of characters to be printed. With the counter 37 originally set to the 1 state, the numerical data of [the numbers of characters + 1] are written into the register 31. The minute the numerical data of the counter 37 is so written into the register 31, the scale-of-n counter 37 is preset to the count value 1 , by the detection output of the word positioning code "BK," through the OR circuit 43 and AND circuit 45.

When the next word data is read out of the memory device 11, the scale-of-*n* counter 37 counts the number of digits of the word data. Upon detection of the word data positioning code "BK" at the code detection circuit 51 a shift instruction is supplied to the register 31. By repeating such operation all the head unit record data is read out of the memory device 11 and the number of digits of each word data of the head unit record data is sequentially stored in the column width memory device consisting of the registers 31 and 32. When the head unit record data has all been read out of the memory device 11, the record data positioning code "BE" is detected from the code detection circuit 51 to cause the flip-flop circuit 24 to be reset through the AND circuit 70 and OR circuit 69, thereby stopping the shifting operation of the memory device 11. Since, however, a Q output is obtained from the flip-flop circuit 24, the shift registers 31 and 32 continue to be shift-operated through the AND circuit 27, OR circuit 42 and AND circuit 44. When the head word data stored in the column width memory device is shifted to the auxiliary register 32, the digit number detection circuit 36 generates a detection output which causes the flip-flop circuit 24 to be set through the OR circuit 22. As a result, the memory device 11 is again shift-driven to generate an output representative of the next record data. That is, the scale-of-n counter 37 counts the number of digits of a first word of the next unit record data. The count value of the scale-of-*n* counter 37 is compared, at the comparison circuit 35, with the number of digits in the head word of the head unit record data stored in the auxiliary register 32. When the word data positioning code "BK" is detected at the code detection circuit 51, if the output of the comparison circuit 35 is in the [I  II], i.e. the number of digits in the head word data of the next unit record data is equal to, or less than, the number of digits in the head word data of the head unit record data, the gate of the AND circuit 33 is opened and the content of the auxiliary register 32 is shifted through the OR circuit 34 to the main shift register 31 where it is stored. Where the output of the comparison circuit 35 is in the [I<II] state, the count data of the scale-of-*n* counter 37 is coupled through the AND circuit 38 to the register 31 and the head word data, i.e. the head column width data, of the column width memory device is thus replaced by the count value of the scale-of-*n* counter 37. In this way, the number of digits in each word of the respective unit record data is counted in the scale-of-*n* counter 37 and the count value of the scale-of-*n* counter 37 is compared columnwise with the number of digits in the word data of the unit record data as read out of the auxiliary register 32. As a result, the maximum number of digits of the word data of the respective unit record data is stored columnwise in the register 31 and the auxiliary register 32. That is, when the content of the memory device 11 makes one circulatory shift, the maximum number of digits of the word data of the respective unit record data is stored columnwise in the column width memory device according to the word data order. In other words, each numerical data stored in the column width memory device constitutes a column width corresponding to the maximum number of digits of the word data of the respective unit record data and the column setting operation is thus finished in readiness for the next printing operation. When the column setting operation is so finished, a print end instruction signal is supplied to the flip-flop circuit 25 to cause the latter to be set. When the record data positioning code "BE" located ahead of the ahead record data arrives at the output section of the memory device 11, it is detected at the code detection circuit 51 and the flip-flop circuit 24 is reset through the AND circuit 70 and OR circuit 69. As a result, the memory device 11 and register 31 stops its shifting operation and at the same time a column width set instruction signal is stopped.

Since in the above-mentioned column width set operation the scale-of-*n* counter 37 is preset to the count value 1 at the start of counting, the count value of the scale-of-*n* counter 37 is equal to the number of digits to be counted, plus 1. Suppose, for example, that the number of digits of a certain word is *m*. If, in this case, the word is read out of the memory device 11 for comparison circuit 35, the scale-of-*n* counter 37 counts it as *m*+1. In consequence, the column width being finally stored in the column width memory device is set to be made equal to the number of digits of maximum digit numbered word data, plus 1. To explain more in detail, where the head word data of the respective unit record data have the maximum number of digits *m*, the head column width data stored in the column width memory device is so set that printing can be made across the column corresponding to *m*+1. In other words, where the word data is to be printed across the column of the recording paper, a column setting is so effected as to leave, between each column, a space corresponding to at least one character. Although the scale-of-*n* counter 37 is preset to 1 in an attempt to provide the above-mentioned space between each column, the same result can also be obtained, if the printing device 16 is stepped, irrespective of the readout of the abovementioned space imparting data, at the head or end of each word upon receipt of an output signal from the *n*-digit memory device 13. In this way, the print start instruction is issued after the column width setting operation is complete. Upon issuance of the print start instruction the flip-flop circuit 25 is set through the OR circuit 23 and the flip-flop circuit 47 is set through the OR circuit 46. At this time, the column width set instruction signal disappears and thus an output 1 appears from the inverter 40. The output of the inverter 40 is supplied through the AND circuit 48 and OR circuit 29 to the AND circuit 30 to cause the gate of the latter to be opened to permit the memory device 11 to be shift operated. When the flip-flop circuit 47 is set, the output of the flip-flop circuit 47 is delivered one through the AND circuit 12 and one through the AND circuit 50 to the n-digit memory device 13. The AND circuit 50 issues a shift instruction to the n-digit memory device 13 upon receipt of the clock pulse. At the same time, the output of the OR circuit 46 is supplied through the AND circuit 53 to the scale-of-*n* counter 37 to cause the latter to be preset to a count value *n*. That is, upon issuance of the print start instruction the memory device 11 and the scale-of-*n* counter 37 start the shift operation. As the gate of the AND circuit 12 is opened, a word data is read out of the memory device 11 and stored in the *n*-digit memory device 13. Upon detection of the "BE" code the flip-flop circuit 24 is reset through the AND circuit 70 and OR circuit 69 to generate a Q output which is coupled to the AND circuit 27. On the other hand, the print start signal is delivered through the OR circuit 23 and flip-flop circuit 25 to the AND circuit 27. The column width memory device effects its shifting operation upon receipt of the output signal of the AND circuit 27 to cause the head word data to be shifted to the auxiliary register 32. At this time, the digit number detection circuit 36 generates an output signal which is coupled through the OR circuit 22 to cause the flip-flop circuit 24 to be set. As a result, the column width memory device stops its shifting operation.

After the head word data of the head record data is read out of the memory device 11, the word positioning code "BK" is detected at the code detection circuit 51. The detection signal of the code detection circuit 51 is coupled to the flip-flop circuit 47 to cause the latter to be reset. The detection signal of the code detection circuit 51 is also coupled to the AND circuit 54, and through the OR circuit 42 and AND circuit 44 to register 31 and 32. This causes the content of registers 31 and 32 to be shifted one digit. That is, the numerical data corresponding to the head column width data stored in the auxiliary register 32 is coupled to the comparison circuit 35 where it is compared with the count value of the scale-of-n counter 37. Since the output of the delay circuit 55 is held to 1 at the time the code detection output "BK" is coupled to the AND circuit 54, the output of the AND circuit 54 is coupled through the OR circuit 56 and OR circuit 49, as a count down signal, to the scale-of-*n* counter 37. The output of the AND circuit 54 is fed back through the delay circuit 57 and AND circuit 59 to the OR circuit 56. During the time period in which no coincidence output appears from the comparison circuit 35 and in consequence the output of the inverter 60 is held to 1, the output signal of the OR circuit 56 is held and the scale-of-*n* counter 37 is set to the down count state. The output of the OR circuit 49, on the other hand, is coupled through the OR circuit 72 and the AND circuit 50 to the n-digit memory device 13 to cause the latter to be shift-driven. Where the data shifted from the memory device 11 to the *n*-digit memory device 13 is composed of numerical data only, no detection output is generated from the character detection circuit 19. Since the flip-flop circuit 20 is reset, an output emerges from the inverter 21. The output of the inverter 21 is supplied through the AND circuit 14 and OR circuit 15 to the printing device 16. That is, data read out of the output digit section of the *n*-digit memory device 13 is inputted into the printing device 16. Where, on the other hand, the data of the n-digit memory device 13 includes any character data, the flip-flop circuit 20 is set. The output of the flip-flop circuit 20 is coupled to the AND circuit 18 to cause the gate of the AND circuit 18 to be opened, thereby detecting the head word data stored in the data group stored in the n-digit memory device 13. Simultaneously with the initiation of the shifting operation of the *n*-digit memory device 13 the word data is read out and inputted into the printing device 16.

Suppose that the content of the *n*-digit memory device 13 is composed of numerical data only. Then, the gate of the AND circuit 14 is opened and the numerical data of the *n*-digit memory device 13 is stored in a manner that it is shifted to the input side. Upon detection of the code "BK" of the code detection circuit 51 the n-digit memory device 13 is shift-operated and the scale-of-$n$ counter 37 is set to the count down state. When the scale-of-n counter 37 is counted down, by the digit pulse (DP), in synchronism with the shifting operation of the n-digit memory device 13, the count value of the scale-of-$n$ counter 37 is coupled to the comparison circuit 35 for comparison. When the count value of the scale-of-n counter 37, upon comparison, coincides with the numerical data, corresponding to the column width, which is already stored in the comparison circuit 35 a coincidence output is generated from the comparison circuit 35, In this case, a distance as measured from the output digit position of the $n$-digit memory device 13 to the end of the word data of the $n$-digit memory device 13 is in a state corresponding to said column width, and printing is effected stepwise within said column width so that the distance as measured from the output digit position of the $n$-digit memory device 13 to the end of the word data of the $n$-digit memory device 13 is covered. In so doing, the output of the inverter 60 is stopped by the coincidence output of the comparison circuit 35 to cause the gate of the AND circuit 59 to be closed, thereby interrupting the output of the OR circuit 56 and at the same time deriving an output signal from the AND circuit 58. That is, the continuous down count operation of the scale-of-$n$ counter 37 by the output signal of the OR circuit 56 is interrupted, and the scale-of-$n$ counter 37 is counted down one digit upon receipt of the output of the AND circuit 58. At the same time, the continuous shifting operation of the scale-of-$n$ counter 37 by the output signal of the OR circuit 56 is stopped and the content of the $n$-digit memory device 13 is shifted one digit by the output of the AND circuit 58 to cause the output of the $n$-digit memory 13 device to be coupled to the printing device 16. Then, the output of the AND circuit 58 is coupled as a printing instruction to the printing device 16 through the delay circuit 62. Where, in this case, a length corresponding to the number of digits of the data stored in the $n$-digit memory device 13 is smaller than the column width of the numerical data already stored in the comparison circuit 35, no data to be coupled to the printing device 16 is present and only the stepping operation of the printing head section of the printing device 16 is effected by the printing instruction. Each time one step movement is effected in the printing device 16, the corresponding end signal is generated from the printing device 16. The end signal is coupled to the AND circuit 63. The output of the AND circuit 63 is coupled to the OR circuit 61 in a manner to correspond to the digit number detection of the scale-of-$n$ counter 37. By the output of the OR circuit 63 the scale-of-$n$ counter 37 is counted down and the content of the n-digit memory device 13 is shifted one digit, issuing a print instruction to the printing device 16. Such operations are repeated, causing the digit data in the $n$-digit memory device 13 to be sequentially supplied to the printing device 16 for printing, while the scale-of-$n$ counter 37 is count down. When all the digit data in the n-digit memory device 13 are printed and at the same time the scale-of-$n$ counter 37 is emptied, the digit number detection output ceases to exist.

The final print end signal of the printing device 16 is coupled through the AND circuit 64 to the AND circuit 66. Since, in this case, the flip-flop circuit 68 is held in the set state by the detection of the code "BK," the AND circuit 66 generates an output signal upon receipt of the print end signal from the printing device 16. The output of the AND circuit 66 is coupled to the OR circuit 46 to generate an output. The output of the OR circuit 46 is coupled to the set terminal of the flip-flop circuit 47 and also to the scale-of-$n$ counter 37 to cause the latter to be preset to $n$. The output of the Or circuit 46 is also coupled to the flip-flop circuit 20 to cause the latter to be reset. As a result, the next word data is read out of the memory device 11 and shifted to the $n$-digit memory device 13, so that the above-mentioned printing operation is carried out.

Where data stored in the n-digit memory device 13 includes character data in addition to numerical data, the flip-flop circuit 20 is set during the data shifting from the memory device 11 to issue a print instruction. Then the head portion of the data stored in the n-digit memory device 13 is read out of the head data detection circuit 17 and delivered through the AND circuit 18 to the printing device 16 for printing. In this case, printing is effected from the head portion of the column set. When the scale-of$n$ counter 37 is emptied, then the next succeeding data is read out of the memory device 11.

In this way, the data read out of the memory device 11 is printed on the recording paper in a manner to correspond to the column data stored in the column width memory device consisting of the registers 31 and 32. When one unit record data is all read out of the memory device 11, a record positioning code "BE" is detected at the code detection circuit 51. The output of the code detection circuit 51 is coupled to the OR circuit 52 and performs the same function as in the case of the code "BK."The output of the code detection circuit 51 is coupled also to the flip-flop circuit 68 to cause the latter to be reset. When, therefore, the unit record data is all printed at the printing device 16 and the scale-of-$n$ counter 37 is emptied, a print end signal is delivered from the printing device 16 through the AND circuit 64 to the AND circuit 67 and then, as a return instruction, back to the printing device 16. As a result, a printing device is returned so as to effect printing operation from a new line. At the end of the return movement, the corresponding signal is coupled to the OR circuit 46 to permit the readout of the next unit record data from the memory device 11 and the subsequent printing by the printing device 16.

The output of the AND circuit 67 is supplied through the AND circuit 71 to the flip-flop circuit 24 to cause the latter to be reset. By the reset output of the flip-flop circuit 24 the registers 31 and 32 are shift operated while the printing device 16 is being returned, until the arrival of a digit number data i.e. a head column data.

Figure 1:
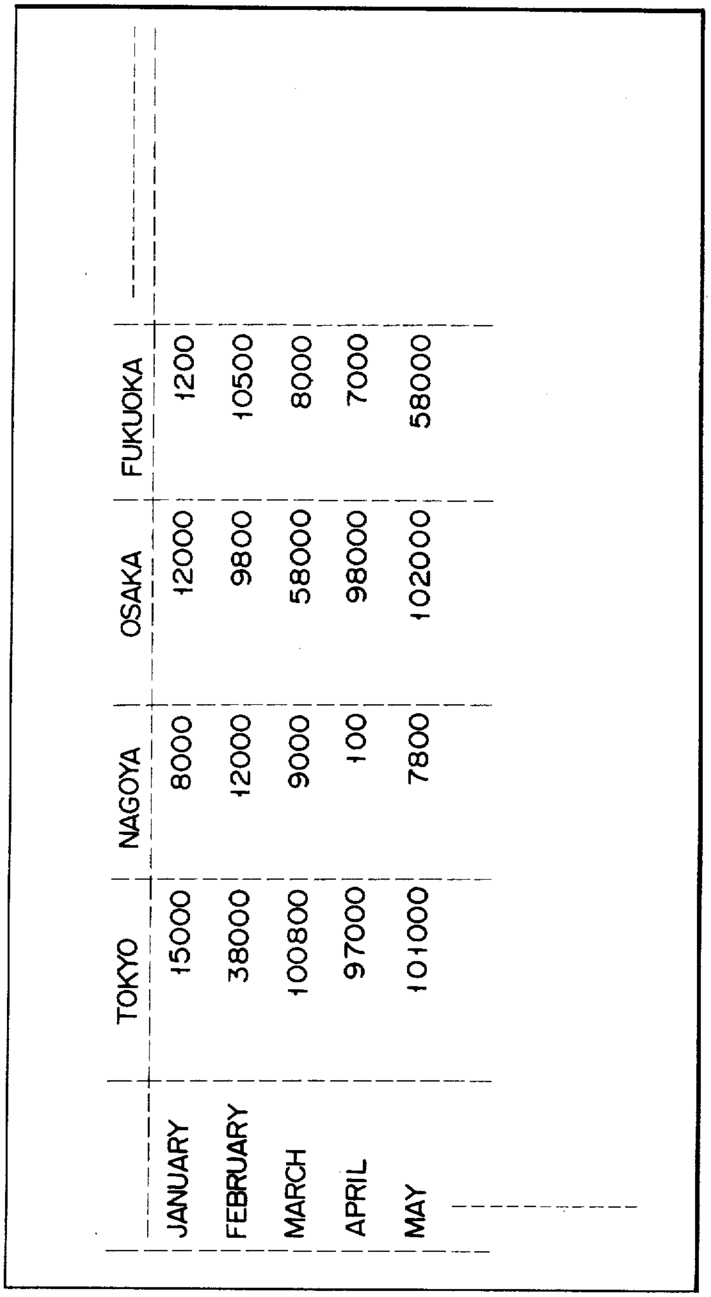
FIG. 1 shows, by way of example, a tabulation in which a column width and word data are printed.

That is, the data stored in the memory device 11 is printed out in a configuration as shown in FIG. 1. A column setting demarcation line as indicated by dotted lines in FIG. 1 is determined by the maximum number of digits to be printed in each column. Since, in this case, the scale-of-n counter 37 counts, after being preset to 1, the number of digits of each word data, there is always left, in each column of the tabulation as shown in FIG. 1, a space corresponding to at least one character, resulting in a clear column division. In other words, the minimum possible column width is automatically selected in a manner to correspond to the word data stored in the memory device 11 and, therefore, a data tabulation operation can be readily and effectively effected.

Although the above-mentioned printing device is adapted to print each unit record data in one line on the recording paper, if a greater amount of data is included in the unit record data, a column setting can be set so that the data can be printed in plural lines on the recording paper. In this case, column width data are sequentially stored at the column width memory device and, where the unit record data is lengthy enough to extend beyond one line, a code for issuing a new line instruction is recorded before that. Upon detection of this code the printing device 16 is returned so that the overflow data can be printed from the new line. That is, the return code can be detected from the column width memory device as the record data positioning code "BE" is detected from the code detection circuit 51.

What is claimed is:

1. A printing device for printing on a recording paper a plurality of unit record data, each unit record data comprising a plurality of data words, in such a tabulation that the word of each of the unit record datum are printed in respective columns so as to form a line and so as to be vertically aligned with the word data of another unit record data to be printed in the same column, the printing device comprising:

data memory means for storing coded information comprised of a plurality of unit record data serially arranged with record positioning codes interposed therebetween and with no space therebetween, each unit record data comprising word data each including a spontaneous number of digits and serially arranged with word positioning codes interposed among them;

counter means coupled to said data memory means for counting the number of digits of each of said word datum as the unit record data are read out from said data memory means one after another;

column width memory means coupled to said counter means for storing the number of digits of each of the word datum of any of said unit record datum, which have been counted by said counter means and which define the width of the column on the recording paper in which the word datum is to be printed;

comparator means coupled to said column width memory means for comparing the number of digits of each of said word datum in any unit record datum, which is stored in said column width memory means, with that of the word datum in the next unit record datum to be printed in the same column;

column width-rewriting means coupled to said column width memory means for writing into said column width memory means in place of the number of digits of each word datum in any unit record datum the number of digits of the word datum in the next unit record data to be printed in the same column if the latter is found by said comparator means to be larger than the former; and printing means coupled to said data memory means and to said column width memory means for printing unit data records in columns on the recording paper;

whereby each column width is determined automatically according to the largest number of digits which has been detected by said comparator means among the word data of the unit record data to be printed in the same column and which has been last written into said column width memory means by said column width-rewriting means.

2. A printing device according to claim 1, further including code detecting means coupled to said data memory means for detecting a word data positioning code and record data positioning code, and means for presetting said counter to a count value of at least more than 1 upon receipt of a code detection output from said code detecting means and for storing as a set column width data into said second memory means a sum output value of a count output value corresponding to the column width plus a count value corresponding to a space of at least one character.

3. A printing device according to claim 2, in which said counter means includes means for counting up and counting down, said counter means counting up the number of digits of the word data read out of said data memory means for generating a count output and said counting means delivering, during a count down operation, a printing instruction to said printing means.

4. A printing device according to claim 1, in which said column width memory means comprises a main register and an auxiliary register for storing said number of digits in a word data, and means for shifting said main and auxiliary registers in a circulatory fashion to thereby shift said number of digits from said main register to said auxiliary register.

5. A printing device according to claim 1, in which said comparator means generates a coincidence output when the number of digits in each of said word datum of any unit record datum stored in said column width memory means equals the number of digits of the word datum in the next unit record datum to be printed in the same column; and comprising means for feeding said coincidence output to said printing means as a printing instruction control signal.

6. A printing device according to claim 5, in which said printing means comprises control means including an n-digit memory means for storing the word data read out of said data memory means; and means responsive to said printing instruction control signal and to a count output from said counter means for shifting word data out of said $n$-digit memory means to be printed by said printing means.

7. A printing device according to claim 2, in which said comparator means generates a coincidence output when the number of digits in each of said word datum of any unit record datum stored in said column width memory means equals the number of digits of the word datum in the next unit record datum to be printed in the same column; and comprising means for feeding said coincidence output to said printing means as a printing instruction control signal.

8. A printing device according to claim 7, in which said printing means comprises control means including an n-digit memory means for storing the work data read out of said data memory means; and means responsive to said printing instruction control signal and to a count output from said counter means for shifting word data out of said $n$-digit memory means to be printed by said printing means.

9. A printing device according to claim 8, in which said printing means includes means responsive to an output from said code detecting means and to a count output from said counter means for printing the word data from said $n$-digit memory means in corresponding columns on the recording paper.

* * * * *

UNITED STATES PATENT AND TRADEMARK OFFICE
CERTIFICATE OF CORRECTION

PATENT NO. : 3,999,164

DATED : December 21, 1976

INVENTOR(S) : Toshio KASHIO

It is certified that error appears in the above-identified patent and that said Letters Patent are hereby corrected as shown below:

Column 12, line 54, after "means for storing the" change "work" to --word--.

Signed and Sealed this

Thirty-first Day of May 1977

[SEAL]

*Attest:*

RUTH C. MASON
*Attesting Officer*

C. MARSHALL DANN
*Commissioner of Patents and Trademarks*